United States Patent
Chowdhury et al.

[11] Patent Number: 5,352,012
[45] Date of Patent: Oct. 4, 1994

[54] VEHICLE ARMREST WITH ENHANCED LOAD SUPPORT

[75] Inventors: Dipak R. Chowdhury, Northville; Thomas A. Coseo, Livonia, both of Mich.

[73] Assignee: Ford Motor Company, Dearborn, Mich.

[21] Appl. No.: 941,008

[22] Filed: Sep. 4, 1992

[51] Int. Cl.$^5$ .................................. A47C 7/54
[52] U.S. Cl. .................. 297/113; 297/411.2
[58] Field of Search ............ 297/112, 113, 115, 191, 297/411, 417, 416, 412, 459, 411.2, 411.29, 411.26, 411.3, 411.32, 452.23, 452.24; 248/118

[56] References Cited

U.S. PATENT DOCUMENTS

| | | | |
|---|---|---|---|
| 717,211 | 12/1902 | Judd | 297/459 |
| 1,036,421 | 8/1912 | Barker | 297/411 |
| 2,824,599 | 2/1958 | Quinlan | 297/113 X |
| 2,832,427 | 4/1958 | Shotwell | 180/2 |
| 2,859,803 | 11/1958 | McCallister | |
| 3,675,969 | 7/1972 | Gage | 297/188 |
| 3,759,569 | 9/1973 | Bennet | 297/188 X |
| 3,877,747 | 4/1975 | Brennan et al. | 297/191 X |
| 4,146,159 | 3/1979 | Hemmen | 224/275 |
| 4,200,166 | 4/1980 | Hansen | 297/411 X |
| 4,533,175 | 8/1985 | Brennan | 297/232 |
| 4,548,326 | 10/1985 | Donna et al. | 297/194 X |
| 4,668,010 | 5/1987 | Fujiwara | 297/150 |
| 4,707,032 | 11/1987 | Chang | 297/417 X |
| 4,861,102 | 8/1989 | Fuller | 297/162 |
| 4,867,500 | 9/1989 | Oosterbaan et al. | 297/411 X |
| 5,056,863 | 10/1991 | DeKraker et al. | 297/411 |
| 5,076,645 | 12/1991 | Yokata | 297/417 |

*Primary Examiner*—Kenneth J. Dorner
*Assistant Examiner*—Milton Nelson, Jr.
*Attorney, Agent, or Firm*—Daniel M. Stock; Roger L. May

[57] ABSTRACT

An automotive vehicle armrest is formed in a cup-like configuration as a unitary metal stamping. The armrest armature includes an upper, load supporting wall from which depends a peripherally continuous sidewall. Elongated depressions are formed in the load supporting wall to define a truss-like configuration to enhance the load supporting capability of the armrest.

4 Claims, 2 Drawing Sheets

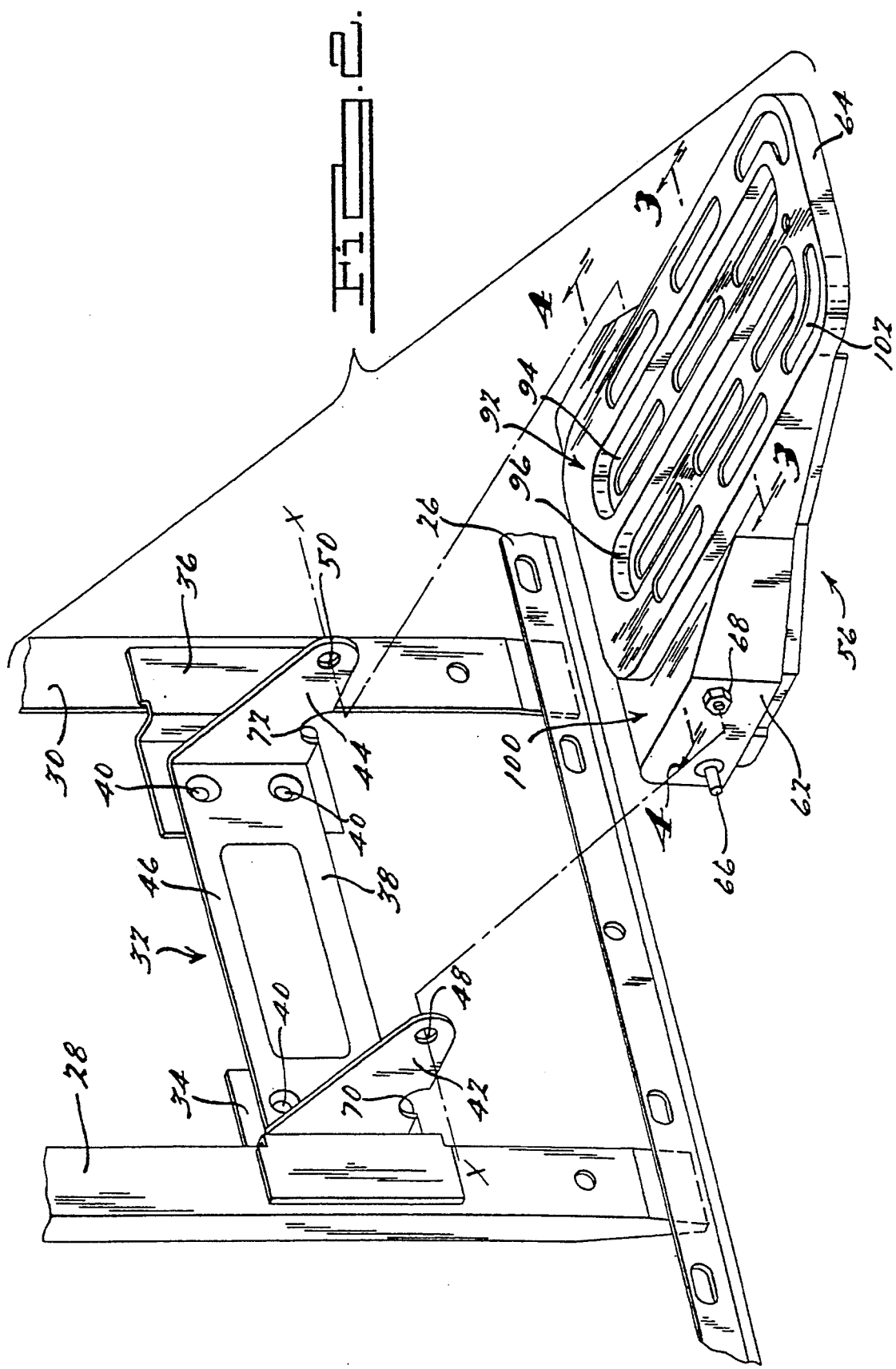

VEHICLE ARMREST WITH ENHANCED LOAD SUPPORT

BACKGROUND OF THE INVENTION

1. Field of the Invention

The present invention relates generally to vehicle seats, and more specifically to folding armrests for use in vehicle seats and the construction of such armrests.

2. Description of the Related Art

To enhance the comfort of vehicle occupants it is common to provide modern automotive vehicles with pivotally movable armrests for the vehicle seats. The armrests are typically pivotally mounted to the seatback near the bight of the seat and may be moved from a vertical position where they are stowed flush with the seatback to an operative position generally horizontal and parallel to the seat cushion where the arm of the occupant may be rested in supporting relationship.

Reducing the weight of such a component in order to enhance the fuel economy of the vehicle in which it is installed is a goal of the automotive designer. This weight reduction goal, however, can be achieved only while maintaining the load supporting capability of the armrest. It is also considered desirable to construct the armrest in a fashion that supports the arm of the occupant without deflection under predicted loads so as to form a stable support.

It is known in the prior art to provide an armrest that is formed as a box-like structure to upper and lower halves as shown in U.S. Pat. No. 5,076,645 to Yokota. The multiplicity of parts utilized in such design has been found to be in many cases unsuitably heavy, complex and expensive; and in certain designs of this type, the armrest may be less resistant to deflection under load than is desired.

SUMMARY OF THE INVENTION

Responsive to the deficiencies of the prior art, the present invention is directed at providing a lightweight armrest that is economical to produce and which provides a stable, relatively non-deflecting support for vertically imposed loads induced by vehicle occupants.

The present invention accomplishes the foregoing by providing an armrest that includes a one piece elongated armature that has an upper load supporting wall and a peripherally continuous sidewall depending downwardly from the load supporting wall to provide the armature with a cup-like configuration that is simple and resistant to deflection under load.

The load supporting wall may be deformed to enhance the load supporting capability of the armature to define a truss like cross-section.

The armature in its preferred embodiment is formed from steel as a simple metal stamping.

BRIEF DESCRIPTION OF THE DRAWINGS

These and other objects and features will be apparent to those skilled in the automotive interior component arts upon reading the following description with reference to the accompanying drawings in which:

FIG. 2 is an exploded view in perspective of the armrest of the present invention.

DESCRIPTION OF THE PREFERRED EMBODIMENT

Figure 1:
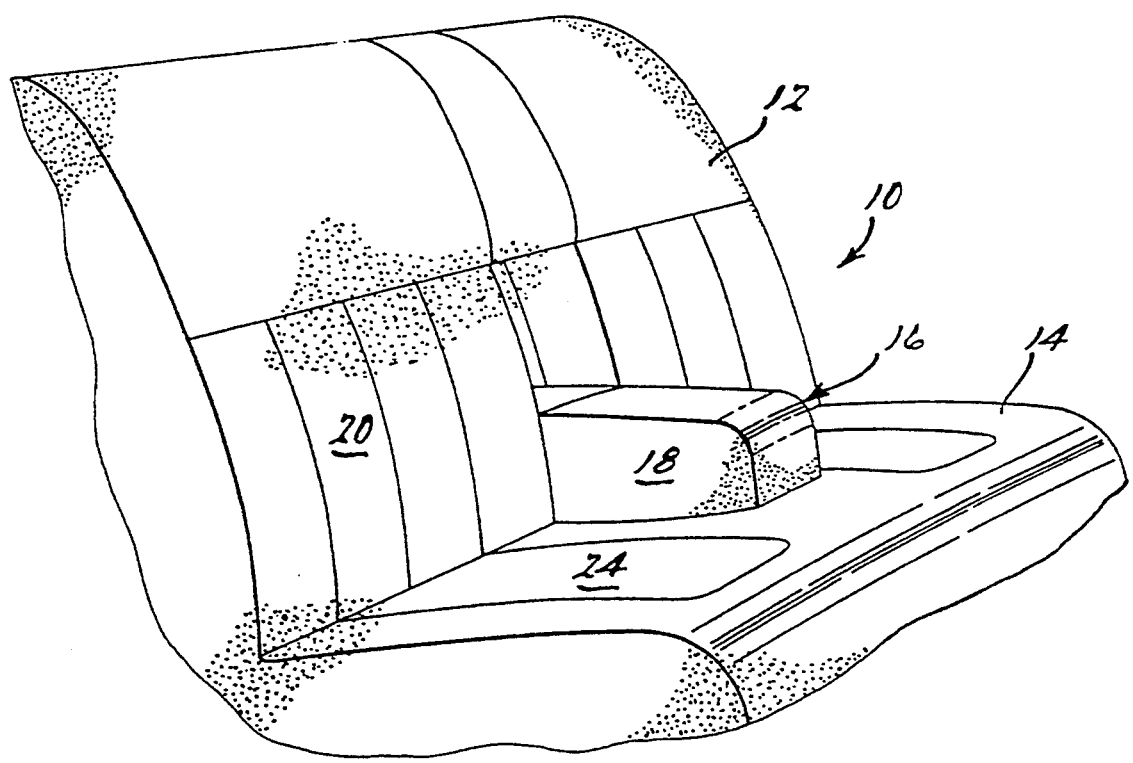
FIG. 1 is a perspective view of the rear seat of an automobile on which is installed an armrest according to the present invention.

Turning now to the drawings, and in particular to FIG. 1 thereof, a motor vehicle rear seat 10 having a seatback 12 and a seat cushion 14 is illustrated as including an armrest assembly 16 mounted for pivotal movement between the generally horizontal operative position shown, in which the forearm of vehicle occupant may be supported and a vertical stowed position in which the lower surface of the armrest 16 is generally flush with the front face of the seatback 12. Suitable soft decorative coverings are provided for the surfaces 18, 20, 24 of the armrest, seatback, and seat cushion 16, 12, 14, respectively, in a known manner.

Turning now to FIG. 2, the operative relationship between the armrest assembly 16 and the seat 10 is illustrated. Carried within the seatback 12 is at least one horizontal support member 26 to which is preferably secured a pair of vertically extending support members 28, 30. An armrest support bracket 32 is mounted between the vertical support members 28, 30. The support bracket 32 includes a pair of mounting plates 34, 36 fixedly secured as by weldments (not shown) to the vertical support members 28, 30 respectively and a generally U-shaped pivotal mounting carriage 38 is fixedly secured to the brackets 34, 36 as by rivets 40. The pivotal mounting carriage 38 includes a pair of upstanding arms 42, 44 projecting perpendicularly from a bridge plate 46 spanning the brackets 34, 36 and extending generally forwardly along the longitudinal axis of the vehicle. The pivotal carriage 38 and its arms 42, 44 are formed as flexible sheet metal parts and the arms 42, 44 include journal holes 48, 50 proximate their free ends for pivotal support of the armrest assembly 16 and forming a part thereof.

The other essential component of the armrest of assembly 16 is the armature member depicted at 56. The armature member 56 is an elongated cup-like member preferably formed from steel as a unitary stamping. It includes an upper load supporting wall 58 and a peripherally continuous sidewall 60 depending downwardly from the load supporting wall 58 to form the cup-like configuration of the armature 56. The vertical height of the depending sidewall portion 60 varies from the thick rear portions indicated at 62 to the relatively thin front portions 64 at the free end of the armature 56.

A pair of nuts 68 (one shown) are fixedly secured to the enlarged rear portion 62 of the armature to mate with journal holes 48, 50 for effecting pivotal movement of the armature 56 about pivot axis X—X. Splaying the arms 42, 44 laterally outwardly to snap over the nuts 68 effects the desired assembly to a position where known axle members (not shown) may be inserted to support pivotal movement. A stop member such as the pins 66 (one shown) be carried on the lateral surfaces of the armature 56 to engage surfaces 70, 72 0f the arms 42, 44 respectively to limit the downward pivotal movement of the armature 56 in its load supporting position. The stamped steel construction of the armature 56 lends itself well to effectively performing this load supporting function.

Figure 3:
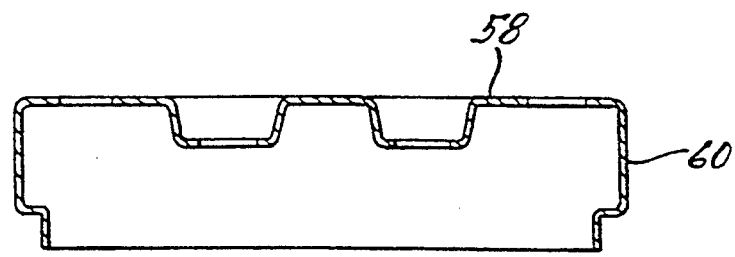
FIG. 3 is a cross-sectional view taken along line 3—3 of FIG. 2.
Figure 4:
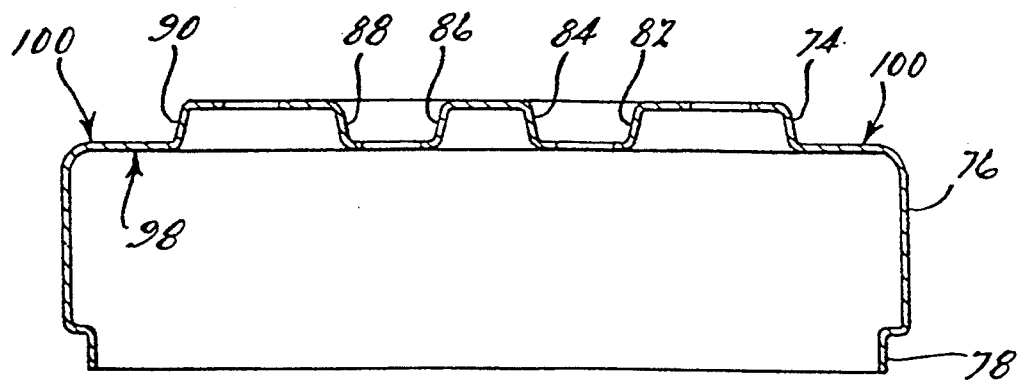
FIG. 4 is a cross-sectional view taken along line 4—4 FIG. 2.

As may best be seen in FIGS. 3 and 4, the cross section of the armature 56 is formed in the stamping operation to create a truss-like configuration, having a plurality of vertical flanges such as indicated at 74, 76, 78 in FIG. 4. The flange configuration 74 is preferably duplicated at 82, 84, 86, 88, 90 in formation of a support pedestal indicated generally at 92 which presents the generally upward facing load support wall 58. The truss-like configuration is formed by two symmetrically arrayed elongated depressions indicated at 94, 96, having bottom walls defining a lower plane 98, which is coplanar with the rear outer periphery 100 of the armature 56. This truss-like construction, coupled with the continuous peripherally depending walls 60 of the armature 56, greatly enhance the resistance of the armature 56 to deflect under downwardly imposed loads, as well as provide resistance to lateral bending when the side loads are input to the armature 56.

This structurally sound cup-like stamped steel configuration of the armature 56 accomplishes the design goal of providing lightweight, economical, strong construction for a pivotally mounted vehicle armrest. Achievement of the design goal is further enhanced, particularly with respect to the providing of the desired function with minimal outlay in weight and material by the design illustrated in FIG. 2, which includes a plurality of elongated slots 102 extending through the load supporting wall 58 and through the bottom of the depressions 94, 96 passing through the lower plane 98.

While only one embodiment of the armrest of the present invention has been disclosed, others will be apparent to those skilled in the automotive vehicle interior component arts without departing from the scope of the following claims.

We claim:

1. In combination with an automotive vehicle seat, an elongated armrest mounted on the seat proximate one end of the armrest for pivotal movement with respect to the seat between a generally vertical stowed position and a generally horizontal operative position for supporting substantially downwardly vertically imposed loads, the armrest comprising:

an armature defining an elongated housing having one end corresponding to the armrest one end and a free end remote therefrom;

means defining an upper load supporting wall on the armature, the upper load supporting wall having a plurality of elongated depressions formed therein, symmetrically arrayed about the longitudinal center of the armature, each extending from a position proximate the one end of the armature to a position proximate the free end of the armature opposite the one end, a plurality of slots being formed through the load supporting wall in the elongated depressions; and means defining a peripherally continuous sidewall depending downwardly from the load supporting wall to define a cup-like configuration for the armature.

2. An armrest as defined in claim 1 wherein the armature is a one piece housing.

3. An armrest as defined in claim 1 wherein the elongated slots are formed in each of the elongated depressions.

4. In combination with an automotive vehicle seat, an elongated armrest mounted on the seat proximate one end of the armrest for pivotal movement with respect to the seat between a generally vertical stowed position and a generally horizontal operative position for supporting substantially downwardly vertically imposed loads, the armrest comprising:

an armature defining an elongated housing having one end corresponding to the armrest one end and a free end remote therefrom;

means defining an upper load supporting wall on the armature, the upper load supporting wall having a plurality of elongated depressions formed therein, symmetrically arrayed about the longitudinal center of the armature, each extending from a position proximate the one end of the armature to a position proximate the free end of the armature opposite the one end, a plurality of slots being formed through the load supporting wall in the elongated depressions; and means defining a sidewall depending downwardly from the load supporting wall.

* * * * *